United States Patent
Snowdon et al.

(10) Patent No.: US 7,711,211 B2
(45) Date of Patent: May 4, 2010

(54) METHOD FOR ASSEMBLING A COLLECTION OF DIGITAL IMAGES

(75) Inventors: David Snowdon, Antibes (FR); Christopher R. Dance, Meylan (FR)

(73) Assignee: Xerox Corporation, Norwalk, CT (US)

(*) Notice: Subject to any disclaimer, the term of this patent is extended or adjusted under 35 U.S.C. 154(b) by 1365 days.

(21) Appl. No.: 11/147,907

(22) Filed: Jun. 8, 2005

(65) Prior Publication Data
US 2006/0280427 A1    Dec. 14, 2006

(51) Int. Cl.
| G06K 9/54 | (2006.01) |
|---|---|
| G06K 9/00 | (2006.01) |
| G06K 9/46 | (2006.01) |
| G06K 9/62 | (2006.01) |
| G06K 9/40 | (2006.01) |
| H04N 1/00 | (2006.01) |
| G06F 17/30 | (2006.01) |

(52) U.S. Cl. ............... 382/305; 382/112; 382/190; 382/224; 382/274; 358/403; 707/7

(58) Field of Classification Search ............ 382/305
See application file for complete search history.

(56) References Cited

U.S. PATENT DOCUMENTS

| 5,363,209 A | 11/1994 | Eschbach et al. |
|---|---|---|
| 5,371,615 A | 12/1994 | Eschbach |
| 5,450,217 A | 9/1995 | Eschbach et al. |
| 5,450,502 A | 9/1995 | Eschbach et al. |
| 5,581,370 A | 12/1996 | Fuss et al. |
| 5,751,286 A * | 5/1998 | Barber et al. ............... 715/835 |
| 6,263,335 B1 | 7/2001 | Paik et al. |
| 6,275,304 B1 | 8/2001 | Eschbach et al. |
| 6,389,181 B2 * | 5/2002 | Shaffer et al. ............ 382/305 |
| 6,608,563 B2 * | 8/2003 | Weston et al. ............ 340/573.1 |
| 6,628,843 B1 | 9/2003 | Eschbach et al. |
| 6,718,051 B1 | 4/2004 | Eschbach |
| 6,795,211 B1 | 9/2004 | Eschbach et al. |
| 6,816,285 B1 | 11/2004 | Eschbach |
| 6,871,231 B2 | 3/2005 | Morris |
| 7,251,637 B1 * | 7/2007 | Caid et al. ................ 706/15 |
| 7,362,919 B2 * | 4/2008 | Das et al. ................. 382/284 |
| 2002/0122067 A1 | 9/2002 | Geigel et al. |
| 2003/0133615 A1 | 7/2003 | Bern et al. |
| 2003/0210808 A1 | 11/2003 | Chen et al. |

OTHER PUBLICATIONS

Andrew Fitzgibbon and Andrew Zisserman, *On Affine Invariant Clustering and Automatic Cast Listing in Movies*, Proceedings of the 7th European Conference on Computer Vision, Copenhagen, Denmark, 2002.

Csaba Czirjek, Noel O'Connor, Sean Marlow and Noel Murphy, *Face Detection and Clustering for Video Indexing Applications*, Acivs 2003—Advanced Concepts for Intelligent Vision Systems, Ghent, Belgium, Sep. 2-5, 2003.

Cormen, et al., *Introduction to Algorithms*, MIT Press, First Edition, 1048 pp., 271 illus, Chapter 17, pp. 329-355, Jun. 1990.

* cited by examiner

*Primary Examiner*—Andrew W Johns
*Assistant Examiner*—Jose M Torres
(74) *Attorney, Agent, or Firm*—Fay Sharpe LLP

(57) ABSTRACT

A method for recommending a collection of digital images from a set of images includes specifying at least one image selection criterion. For each of a plurality of images in the set of images, an image quality value for the image is determined. Images are recommended for the collection by taking into consideration the image quality value for the images and the degree to which the collection satisfies the at least one image selection criterion.

25 Claims, 2 Drawing Sheets

METHOD FOR ASSEMBLING A COLLECTION OF DIGITAL IMAGES

BACKGROUND

The present exemplary embodiment relates to the field of digital images. It finds particular application in connection with the automated recommendation of a collection of digital images from a larger set of images, which best meets a set of user-selected criteria.

Sales of digital photographic equipment now exceed those of film-based equipment and many mobile phones now come equipped with the capability to take still photographs or capture short movie clips. The growth in digital photography has driven a demand for accessories, such as photo-quality printers for the home, photograph printing via the web and, particularly in the case of mobile phones, short-range radio communication via technologies such as Bluetooth™ wireless technology. The economics of digital photography enable users to take many more photos, with a view to subsequently selecting from these a set to be preserved in a main record of the event. However, when several photographers are recording the same event, the task of selection can be daunting.

REFERENCES

Czirjek, et al., "Face Detection and Clustering for Video Indexing Applications," in Advanced Concepts for Intelligent Vision Systems, Ghent, Belgium, (Sep. 2-5, 2003) describes a method for face detection in digital images.

Fitzgibbon, et al., "On Affine Invariant Clustering and Automatic Cast Listing in Movies," in Proceedings of the 7th European Conference on Computer Vision, Copenhagen, Denmark (2002) describes a face detection algorithm which can be applied to frames of a movie.

U.S. Patent Application 2003/0210808, published Nov. 13, 2003, for "Method and Apparatus for Organizing and Retrieving Images Containing Human Faces," to Chen, et al., which is incorporated herein in its entirety by reference, discloses a method of organizing images of human faces in digital images into clusters by locating images of human faces in the digital images using a face detector, extracting the located human face images from the digital images, and forming clusters of the images representing an individual.

U.S. Patent Application 2002/0122067, published Sep. 5, 2002, for "System and Method for Automatic Layout of Images in Digital Albums," to Geigel, et al., which is incorporated herein in its entirety by reference, describes a two-stage process for the creation of digital photograph albums using genetic algorithms. A first genetic algorithm is used to assign images to pages and then a second genetic algorithm is used to lay out the images on each page.

BRIEF DESCRIPTION

Aspects of the exemplary embodiment relate to a method and a system for recommending digital images for a collection. In one aspect, a method includes specifying at least one image selection criterion. For each of a plurality of images in a set of images, an image quality value for the image is determined. Images are recommended for a collection of digital images from the set of images by taking into consideration the image quality value for the images and the degree to which the collection satisfies the at least one image selection criterion.

In another aspect, the system for recommending a collection of digital images from a set of images includes a component for evaluating images in the set of images and assigning an image quality value to each of the evaluated images, a memory which stores at least one image selection criterion, and a module for recommending images for the collection taking into consideration the image quality value for the images and the degree to which the collection satisfies the at least one image selection criterion.

In another aspect, a system for automatically recommending a collection of digital images from a set of images includes an acquisition processor for acquiring images from a plurality of digital devices, a component for identifying images in the set of images which are responsive to at least one of a plurality of queries and assigning a label to an image corresponding to which of the queries it is responsive to, a component for automatically evaluating images in the set of images for image quality, and a module for recommending images for the collection based on an image quality value for each image which takes into account an image's label and its evaluated image quality.

DETAILED DESCRIPTION

Figure 1:
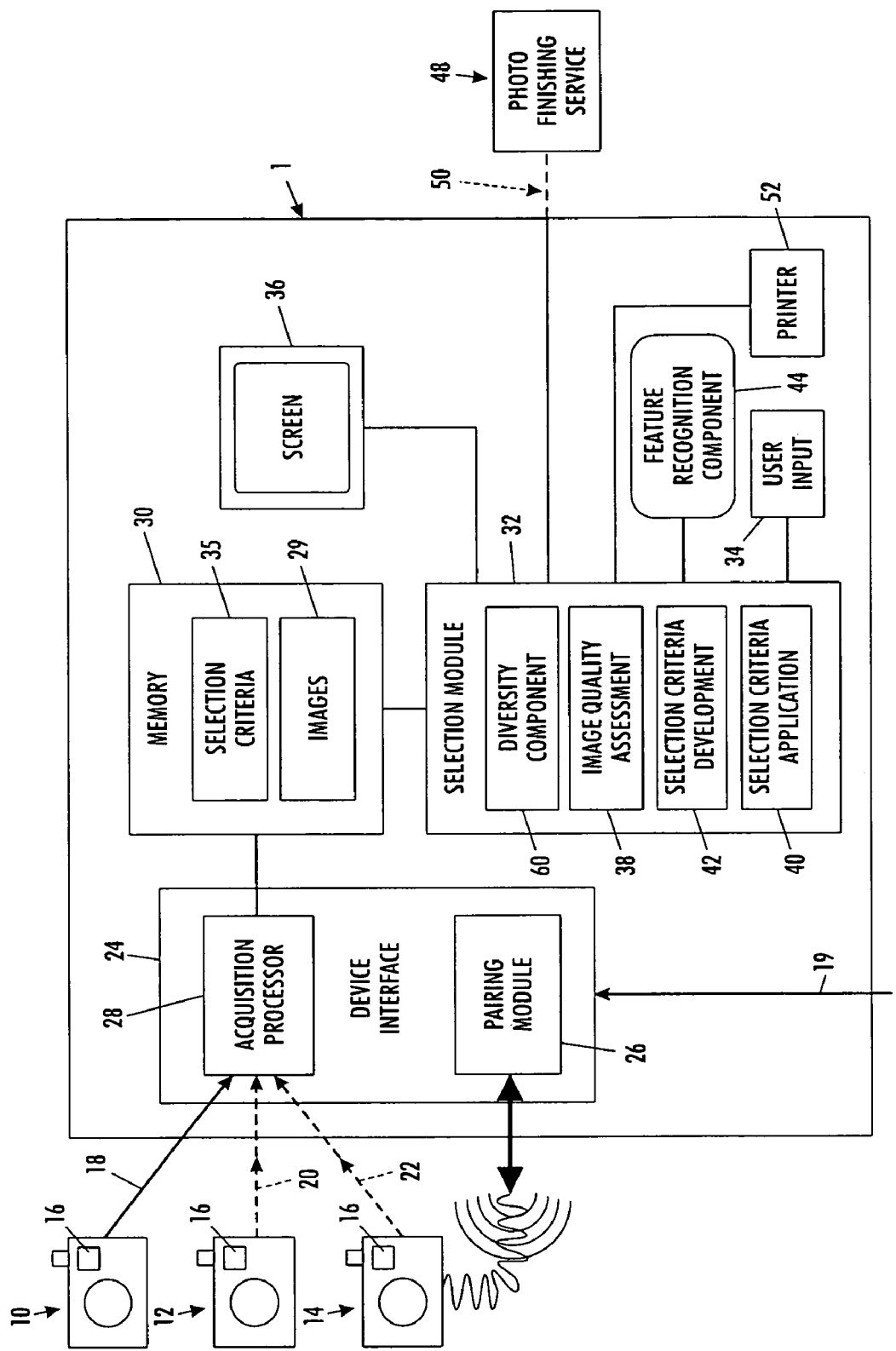
FIG. 1 is a schematic view of a system for acquisition and selection of images according to an exemplary embodiment.

In aspects of the exemplary embodiments disclosed herein, a system and method for recommending a subset of images from a larger set of images are provided. The system enables a substantially automated selection of a subset of images, such as digital photographs, from a larger set of images, the subset being responsive to one or more selection criteria. Image quality criteria may also be applied in generating the subset. The set of images may thus be reduced to a more manageable subset of relevant images without the need for a user to review each of the images in the set manually. In one aspect, selection criteria may each be expressed in the form of one or more user-oriented queries. In another aspect, the selection criteria include maximization of a diversity feature, such as the number of people present in the subset. In yet another embodiment, the selection criteria may be expressed in the form of one or more queries which are related to the information in the metadata of recorded images.

The image selection system takes advantage of the widespread availability of digital photography equipment for capturing related images. The images may be related in that they are all of the same event or location. Typical events at which the system may be employed include weddings, conferences, school and business events, public events, visits to theme parks and other attractions, and the like. The images may be captured by one or more digital devices, such as cameras, cell phone cameras, video recorders, and the like. The images may be assembled and the selection may take place in real time or in near real time, for example using wired or wireless links between the digital devices and the image selection system. Wireless technology, such as Bluetooth™ and Wi-Fi may be particularly useful when all or part of the image selection system is located close to the digital devices capturing the images or where the wireless link connects with a wired or broadband access to the image selection system, for example, via the internet.

The term "image," as used herein, may include a single image, such as that generated by a digital camera, as well as a sequence of images, such as a sequential set of frames of a video clip.

Users of the image selection system may include photographers, i.e., the people owning/using the digital devices, who will be referred to herein as "device users"; users who input image selection criteria and/or who seek to collect an image collection, who will be referred to as "collection users"; and one or more "administrative users," who operate the image selection system and may or may not receive a collection. There may, of course, be overlap between the user groups, for example, the collection users may include non-photographers as well as some or all of the device users.

In one embodiment, the image selection system enables the collection of photographs taken of an event by multiple independent photographers who need not be working together in a coordinated fashion and the largely or completely automatic assembly of a collection of selected photographs that can be distributed to participants at the end of the event. An advantage of the image selection system thus resides in its ability to produce a set of recommended photographs from among a large number of photographs from multiple sources without requiring the need for coordination between the parties taking the photographs (whether human or automatic). This facilitates the sharing of large numbers of photographs, for example, through a photofinishing service.

The selection system may take into account that images of an event vary in both quality and relevance. The quality of an image depends on the resolution of the digital device (number of pixels in an image) and more variable factors, such as contrast, blurring, and the like. The relevance of an image to an event may include such factors as whether the image relates to a significant part of the event, such as a cake cutting ceremony at a wedding, or to significant people present, such as the bride and groom in the wedding example. Additionally, the relevance may vary depending on the recipient of the collection to be selected. Where several photographers are photographing the same event, images collected by one photographer may be duplicative of images collected by another photographer. Thus, for example, the relevance of a poor resolution image may be considered low where there are better resolution images available in the set.

The relevance of the image may be determined, at least in part, from metadata associated with the recorded images, e.g., the position, time, and user who took the picture, etc. Information on the time and/or position at which particular events considered to be of high relevance took place can be input to the image selection system for correlating with the information from the metadata to identify images of high relevance.

FIG. 1 illustrates an exemplary collection and selection assembly for gathering and selection of images. The assembly includes an image selection system 1 and a plurality of digital devices (e.g., cameras, mobile phones with embedded cameras, web cams, etc.), here illustrated by cameras 10, 12, 14, each with an image storage medium 16. The digital devices communicate with the image selection system 1 via wired links 18 and/or wireless links 20, 22. A device interface 24 of the image selection system 1 may include a pairing module 26 comprising a processor which detects the wireless devices 12, 14. Non-wireless devices 10 may communicate with the image selection system 1 by a wired link 18, either directly or via the internet. For example, the camera's image storage medium 16 may be removed and loaded into the image selection system 1 or connected thereto by a suitable interface. The illustrated image selection system 1 includes an acquisition processor 28 which captures the images 29 from the devices 10, 12, 14 and stores them in a memory 30. A selection module 32 accesses the memory 30 and selects images from the set to form the subset. A user may communicate with the selection module 32 via a user input interface 34, such as a keyboard, touch screen, and/or or via a web-based interface. The selection module 32 may generate selection criteria 35, which may be based, in whole or in part, on user inputs which are displayed on a screen 36. Or the selection module 32 may be preprogrammed with the selection criteria 35 and operate without user input. The selection criteria 35 may be stored in the memory 30.

The selection module 32 includes software-based components including code for automatically evaluating image quality and for automatically recommending images for the collection. The selection module components may include an automated image quality assessment component 38 for assessing image quality of images and for assigning an image quality value to the images based on the assessment and a selection criteria application component 40 for automatically applying one or more image selection criteria to the images and for recommending images for the set. Where the selection criteria are developed wholly or in part through user input, the selection module 32 further includes a selection criteria generating component 42 which generates the selection criteria automatically or semi-automatically through user interaction. The selection module 32 may also access or incorporate a feature recognition component 44 for determining whether images are responsive to certain selection criteria, thereby enabling recognition of features such as faces, locations, object types, and the like.

The feature recognition component 44 may include software for distinguishing features of images. Images can then be labeled according to which of the features are identified within the image. For example, the feature recognition component 44 may identify distinguishable portions of people, locations, and the like, such as faces. However, for certain events, other distinguishable features may be identified, such as the king by his crown or a bride by the white dress, athletes by numbered jerseys, etc. Locations may be identified by a distinguishable part of the location, or by the time at which the image was generated. Through interaction with a user, the selection module 32 may identify significant features, such as "bride," "groom," "the president," etc. in one image and use the recognition software to identify the same significant features in other images. The feature recognition software 44 may also be used to distinguish between features. For example, if one of the selection criteria is to maximize the number of different people in the image subset, the feature recognition software need not identify the people as "Mr. Smith," "Mrs. Brown," etc., but merely recognizes when different people are present in an image.

The selection module 32 may communicate with a photofinishing service 48 via a wired or wireless link 50. The photofinishing service may store images in the set or subset and/or be used for printing a collection of selected images. Alternatively or additionally, the system may incorporate a printer 52 or be linked thereto by a wired or wireless connection, either directly, or through a network.

The image selection system 1 may be instantiated in the form of an article of manufacture, such as a software storage medium, such as a disk, or a hard drive of a personal desktop computer, laptop, or a dedicated image processing system. The selection module software may be suited to running on a general purpose computer, such as a desktop PC or laptop computer that has the appropriate interfaces (Bluetooth and/or Wi-fi, memory card readers, and the like). Alternatively, a dedicated system 1 may include the appropriate software and hardware for acquisition and selection of images and user input, optionally also with printing capability. This instantiation provides a portable system that can be optimized for the application and use by non-computer-literate users.

In another embodiment, the system 1 is incorporated into a color printer. For example, many color printers intended for home users now include a number of interfaces designed to allow people to print images without the need for a computer. Printers are now available that are capable of accepting a variety of memory card formats in addition to receiving images by iRDA (infrared) or Bluetooth. These printers often have small LCD screen and simple user interfaces that allow users to select which photographs to print from those available on a memory card. Such a printer can be adapted to incorporate the present system 1 by providing or adapting a user interface for allowing selection criteria to be entered and incorporating the selection module 32 as software.

It will be appreciated that not all the components of the system 1 need to be at the same physical location. For example, some of the components may be brought to the event being photographed while other components are remotely located and may communicate with other components by wired or wireless links or be subsequently linked with the components brought to the event.

Figure 2:
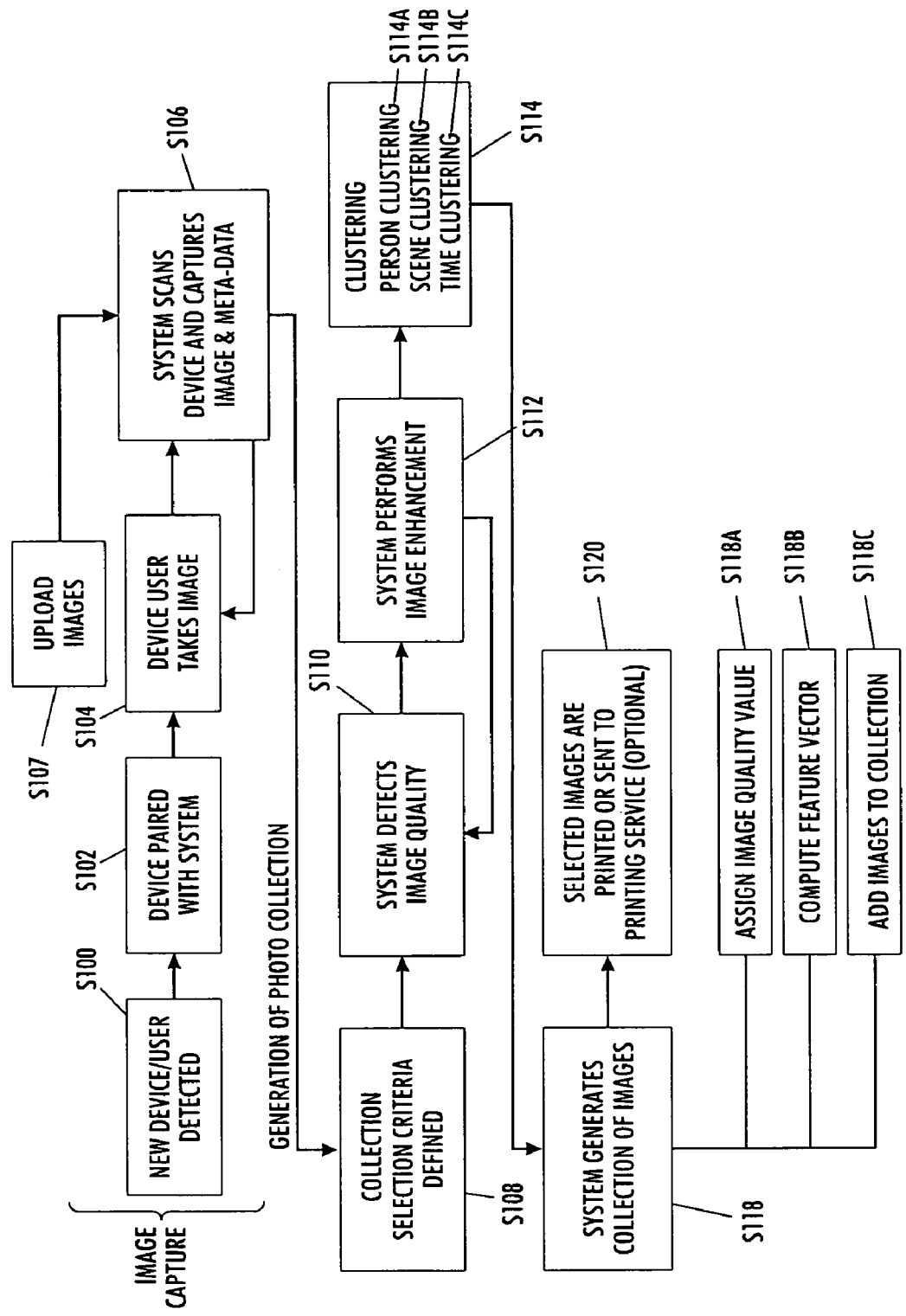
FIG. 2 is a flowchart which shows steps in an exemplary process for acquisition and selection of images.

FIG. 2 demonstrates an exemplary process for capturing and selecting images. For simplicity, the steps are shown for a single digital device and a single collection user. It will be appreciated that there may be multiple digital devices and multiple users interacting with the system 1 at the same or different times. Additionally, each collection user may use different selection criteria and thus generate a different subset, i.e., a personalized collection. Further, the activities of users need not be synchronized so that one or more users may be interacting with the system 1 at different stages of the process. The recited order of processing elements or sequences, or the use of numbers, letters, or other designations therefor, is not intended to limit the claimed process to any order except as specified in the claim itself.

At step S100, a new digital device (e.g., 10, 12, 14) is detected by the system 1. This can occur, for example, in one of two ways:

1. The digital device has built-in wireless networking (e.g., Bluetooth™ technology). When the digital device comes within range of the system 1, the system detects the digital device. If the digital device is already known to the system 1 from previous events, then the digital device can be associated with a particular registered device user or users. Otherwise, the registration of a digital device with a particular device user may occur through the user input device 34.

2. The digital device does not have built-in networking and so the system's device interface 24, e.g., via a web connection 19, can be used to register the device user manually with the system 1.

At step S102, the system 1 establishes a network connection to the detected device 12, 14 so that it can check for new images and download them. In a Bluetooth™ type of network this corresponds to a "pairing" operation (e.g., performed by pairing module 26). In a Wi-Fi network, an authentication procedure may take place prior to the opening of a communications channel (either a basic socket connection or using some already existing file sharing protocol such as SMB/Samba software).

In one embodiment, the system users can make use of the display 36 and input devices 34 attached to the computer to control the operation of the system 1 and upload new photographs, optionally with the concurrent use of a web-based user interface.

At step S104, a device user records one or more images (e.g., by taking a new photograph) on the device's internal storage medium 16.

At step S106, the system 1 periodically scans the available images on each registered device user's camera 12, 14 and downloads copies of any images that have been taken since the last scan via the acquisition processor 28. The image and its associated meta-data are stored in the memory 30. The meta-data may include such information as date and time of capture, position of capture, direction of capture, user who recorded the image, image resolution, and the like.

Steps S100, S102, S104, and S106 can be replaced by a single upload operation of the images 29 from a camera storage medium 16, or other storage medium, such as a desktop or laptop computer, memory card, or CDROM, either directly or through a web-based user interface, in the case where a realtime wireless link is not available for one or more users (Step S107). Wireless and non-wireless capture of images can be freely mixed.

At step S108, an administrative user, such as the owner or operator of the system 1 for the event, enters desired parameters of the image collection or subset that the system 1 is to generate, using the user input device 34. These selection parameters may include selection criteria, which may include one or more of:

1. The desired number of photographs in the collection (or a range, such as no fewer than 20 and no greater than 25 photographs).

2. A minimum image quality threshold.

3. Diversity selection criteria, e.g., whether the collection should attempt to capture the maximum number of different people and/or locations.

4. Specific feature selection criteria, such as whether the collection should attempt to capture selected people and/or locations; e.g., whether it should attempt to detect people in a scene, find which photographs those people appear in, and select photographs so that each person appears in the collection a minimum number of times.

5. Device and/or device user selection criteria, such as whether the system 1 should attempt to use a roughly equal number of photographs from each contributing device/device user.

One or more of the selection criteria may be preset or default selection criteria. The desired parameters entered by the administrative user may also include whether automatic image enhancement (AIE) should be applied to each image.

At step S110, the system 1 may determine the quality of each image. At step S112 the system applies automatic enhancement techniques, where appropriate, if this criterion has been selected or is a preset or default criterion. Image quality may be determined by evaluating the image for one or more image quality criteria, such as exposure, contrast, saturation, color balance, and blur. The image quality value may be a very simple metric—e.g., "was the image taken with the lens cap on," "is there a JPEG encoding error," or "is the file big enough." In one embodiment, image quality is determined after any automated enhancement is performed.

Automatic enhancement techniques which may be applied include determining whether any local/global contrast correction or red-eye removal is appropriate and applying those corrections if the collection user has selected that option. For example, the AIE techniques used may automatically modify images by adjusting one or more of exposure, contrast, sharpness, color balance and/or saturation. After analyzing the image, automatic image enhancement techniques automatically determine corrective actions to perform on the image.

The determined appropriate image processing is then applied to the image. Since these are being performed in a fully automatic mode, conservative image processing parameters can be chosen to ensure that the image quality does not get worse. Blur may be determined, for example, by the gradient of the sharpest edge in the image and contrast by the distance of a histogram of the image from a uniform histogram. U.S. Pat. Nos. 5,363,209, 5,371,615, 5,450,217, 5,450,502; 6,275,304, 6,628,843, 6,795,211 and all to Eschbach et al., U.S. Pat. Nos. 6,718,051 and 6,816,285 to Eschbach, and U.S. Pat. No. 5,581,370 to Fuss et al., the disclosures of all of which are incorporated herein by reference in their entireties, disclose various automatic image enhancement techniques which may be incorporated in the automatic enhancement step. The image enhancement step may include performing other preselected "enhancements," such as general computer graphics modifications to the original images. For example, a modified background may be applied (e.g., a romantic beach scene for a wedding photograph) or a popular character (Mickey Mouse) walking beside a child.

At step S114, clustering of selected features is performed. At substep S114A, if a specific feature section criterion relating to a person or people has been requested by the collection user or if a diversity selection criterion is being used, the system 1 identifies whether there are any people features present in each image. This may include applying techniques for face detection or searching for the region of the image that corresponds to skin. Exemplary recognition techniques which may be used include those described in the above-mentioned Fitzgibbon, et al., and Czirjek, et al., references and in published U.S. 2003/0210808, which are expressly incorporated herein by reference. As discussed above, the recognition software component 44 need not attempt to determine the identity of each detected person, but may simply attempt to recognize whether the same person appears in several images. To do this, the recognition component 44 may use the color of clothing or a bag of key points extracted from the face or other areas of the body.

At substep S114B, if the user has selected a specific feature selection criterion relating to a location or locations, or if a diversity criterion includes locations as well as people, the system 1 attempts to detect images of the same location. It can do this by checking for similarities between consecutive images from the same digital device (based on the assumption that a device user will often take more than one photograph of the same location) and by using image features such as bags of key points. Similar substeps can be performed for other selected features or criteria, such as clustering by time (substep S114C) or by position (not shown). For example, metadata of recorded images can be used to determine the time and/or position of capture of an image which can then be correlated with an event or location.

In alternative embodiments, Step S108 (selection criteria specification) can be performed prior to or during the photo capture steps (steps S100, S102, S104, S106, S107), in particular, if a previously stored profile comprising the selection criteria is selected or if on demand collection generation is desired. This may be the case when the system 1 is often used for similar occasions (e.g., field trips) and so it becomes worthwhile storing a profile which can be simply selected each time the system 1 is used. On demand collection generation can be useful if the collection is desired soon after the end of the event. Since the selection criteria are known in advance, the system 1 can make use of spare idle time in between image capture to perform steps S110, S112, S114, and S118, and so have as much as possible of the what may be time consuming image processing done by the time that the user requests the collection.

At step S118, the system 1 generates an image collection. In one approach, the selection of a subset of the images may include identifying a set of images that most probably answers a set of hypothetical user queries that are Boolean combinations over image attributes. This is related to the weighted partial cover problem. In another approach, the selection of a subset of the images may include identifying a set of images that optimizes a combination of an image quality measure and a collection diversity measure (producing, for example, a subset of images that takes into account the quality of the images while attempting to maximize the number of people represented in the subset).

At step S120, the images in the collection are printed or sent to a printing service. Alternatively, a user is provided with a CD ROM, DVD, or other digital recording of the image collection. In yet another embodiment, the collection is made available to the collection user via an internet site or delivered or downloaded by a messenger or email application onto their device (e.g., 10, 12, 14). The collection user may select all or a portion of the collection for printing.

In some cases, it may be desirable for every collection user to have the opportunity to collect a personalized collection of photos, in which case, every collection user, or the administrative user on their behalf, performs step S108 and enters selection criteria applicable to them. In addition to the selection criteria listed above, collection users may wish to specify that the generated collection contains a high proportion of photographs taken by them.

Generating an Image Collection

In general, desirable properties of a generated image collection are that it contains images of high quality (or avoids images of low quality) and that it is representative of the diversity aspects of the set of collected images from which it is derived. The diversity aspects may be those which are of interest to the collection user. The image quality assessment component 38 of the selection module evaluates the images according to one or more image quality criteria. To avoid cases such as the generated collection showing only images of a single person for an event at which a plurality of people were present, the selection module 32 may also include a diversity component 60. Where a diversity criterion has been selected at step S108 (or is preset), at step S118, the diversity component 60 attempts to maximize the number of different features (e.g., people and/or locations) in the image collection, for example, by employing the results of recognition software and generating a feature vector, as discussed in greater detail below. The image collection may be generated, for example, using the following steps:

1. Each image in the set is assigned an image quality value (substep S118A) using information obtained in step S110. The image quality may be expressed as a single value which is a function of the values for each of the image quality criteria evaluated, such as a product or sum or a weighted product or sum of the image quality criteria evaluated. In an exemplary embodiment, each image is assigned a single score from 0 to 1, with 1 corresponding to the highest quality image. In an alternative embodiment, an image quality value may be assigned in step S110.

2. A feature vector is computed for each image (substep 118B) using information obtained in steps S114 and S118. Features may describe the presence of a person in an image and the location depicted in the image. These features can be represented as vectors of bits where each bit represents the presence or absence of a person or whether the image features a given location. Usually, an image is of only one location (so only one of the location bits is set) but can contain an arbitrary number of people (so an arbitrary number of person bits may be set). An example image representation is shown below for the case in which the collection shows images at five different locations and includes 20 different people. Here, the image is of a location designated as location 4 (represented in binary code as a 1 in the fourth place) and includes people identified as 4, 9, 15, 18, 19, and 20:

| Image Quality (0.0-1.0) | Place Vector | Person Vector |
| --- | --- | --- |
| 0.5 | 01000 | 11100100000100001000 |

3. Images are added to the collection based on their image quality values and a determination of the extent to which the image, when added to the collection, satisfies the selection criteria (substep S118C). The selection criteria application component 40 uses a method for recommending images for the collection based on the extent to which they satisfy the selection criteria. In one embodiment, the algorithm approximately optimizes a collection score criterion with respect to the selected collection of images. One method of optimizing a collection score criterion is described below, followed by other methods of recommending a collection which also take into account image quality as a selection criterion. In general, the method attempts to generate a subset of images which, as a group, provide an optimized response to the selection criteria, while also taking into account the image quality criteria. It will be appreciated that the recommended collection of images may not be the globally optimum collection for the given selection criteria and image quality criteria as other constraints may be placed on the system such as the maximum time allocated for running the method.

Some digital cameras (such as the Ricoh Caplio Pro G3, http://www.geospatialexperts.com/ricoh.html) now have the ability to associate additional information with a photograph such as the location (measured by GPS) at which the photograph was taken or textual notes. This information may be exploited by the system 1 to allow selections of photographs that are distributed evenly across a space or to check for certain keywords associated with the photos.

Model for a Criterion to be Optimized

The quality of a photograph collection can be quantified as the expected reward when a hypothetical user-generated query corresponding to a selection criterion is made to the collection. To explain the collection score, the following process can be envisaged:

1. The user makes a query.

2. If the collection generated from the set of images contains images satisfying the query, the system is rewarded. The reward can be considered as being in proportion to the measured image quality of the best of these images.

3. If the collection contains no such image, nothing happens.

To obtain a collection score, queries q can be modeled as drawn from some query set Q. Set Q may contain simple queries, such as for a particular person or location, e.g., a particular person $P_1$ selected from a set of people $P_1$, $P_2$ $P_3$ . . . , or a particular location $L_2$ selected from a set of locations $L_1$, $L_2$ $L_3$ . . . . Or the queries may be composite queries, such as the conjunction of a person and location, e.g., $P_1$ at $L_2$ or the conjunction of two or more people, such as $P_2$ and $P_3$, or $P_1$ and $P_x$ where $P_x$ can be any person selected from a set X. Set X may be the entire group of people in the image set or may be a particular subset of the group, such as the bride's family, in the wedding example, or the teachers at a school in a school event. It will be appreciated that highly sophisticated queries can be achieved by defining groups of people, identifying specific locations, even excluding particular people, locations.

Some queries can be more likely than others to be satisfied. To model this, let $\pi_q$ be the probability of a query q being asked. The value of $\pi_q$ can be from 0 to 1. In one embodiment, the values of $\pi_q$ could be replaced by some fuzzy weighting values. The measured image quality of photograph p that satisfies query q can be denoted by: $w_q^p$, if the image satisfies the query. Otherwise, if the photograph does not satisfy query q then $w_q^p = 0$ The objective is to select a collection C of photographs of size at most $N_c$ from the set of N images which maximizes the expected reward:

$$E[\text{reward} | C] = \sum_{q \in Q} \pi_q \max_{p \in C} w_q^p \qquad \text{Eqn. 1}$$

I.e., the expected reward is a sum, over all the queries of the product of the probability of each query and the image quality of the best quality image which satisfies the query (where there is more than one image which satisfies the query). Thus, for example, a photograph which satisfies a query having a high probability (i.e., one which is considered important to have in the collection) may appear in the collection even though the image quality is lower than other images in the set, where these other images satisfy a lower probability query.

Collection Optimization

While the collection may be determined at substep S118C by maximizing the reward using Eqn. 1 above, the maximization of Eqn. 1 tends to be time consuming for large collections. In one embodiment, therefore, the method performed by the selection criteria applying component 40 can be iterative, deterministic, and at the same time, be one that does not require backtracking. The algorithm used to apply the method may have a bounded execution time. For example, the execution time is proportional to $N \, N_c$, where N is the total number of input images and $N_c$ is the number of images specified for the collection. The exemplary method greedily takes images out of the candidate set of images/and places them in the collection C. For example, the method includes the following steps:

1. Set C to be the empty set and/to be the set of all input images.

2. While set C has fewer than the desired number of images $N_c$ a) For each image p from/a score is computed:

$$\text{score}(p) = \sum_q \pi \{ \max_{r \in C \cup \{p\}} w_r^q - \max_{s \in C} w_s^q \} \qquad \text{Eqn. 2}$$

where w is the image quality weight, q is the hypothetical query index, and r is the image number. The score (p) corresponds to the change in the expected reward (Eq. 1), were image p to be included with the current collection. Term q of the sum is the additional contribution of image p to answering query q.

b) Remove the image with the highest score from/and place it in C.

In collection optimization, in the case where all queries are satisfied using less than the specified maximum number of images, several options are available. For example, a repeated application of the optimization method may be employed. In each repeat, subsets of the queries are selected in proportion to the number of times they are satisfied in the original input set. Thus if there are many input photographs of a bride, for example, the collection will include many in the output.

While the method may assume that all people and locations have the same importance, it is also contemplated that a weighting is added to adjust the priorities of specific people even with only face clustering (not recognition). For example, the system may display exemplars of all detected faces and users manually indicate via the user input 34 if any were more important than the others. If face recognition is also used, then priority can be given to those faces to which the system could assign an identity (for example celebrities or family members for whom the system could already have been trained).

Query Generation

Each selection criterion may be expressed in terms of one or more queries. The queries can be generated in various ways. Three methods for generating the query set or distribution are given as examples:

1. Generic: A fixed allocation. For instance, there can be one query for each feature extracted from the input image set, and an equal weight associated with each.
2. Learning: Given example input image sets and collections drawn from them, the system may automatically learn conjunctions and disjunctions over features that capture possible queries. Probabilities/weighting can be modeled by counting.
3. Manual: A human specified set of queries and associated weights. In one embodiment, these are context (e.g., location and or time) dependent. For example, for a wedding, the set of queries may include:

| | Query | |
|---|---|---|
| Location/time | Who | Probability Weight |
| Arrival | groom and not bride | Medium |
| Arrival | bride and not groom | Medium |
| arrival | guest1 | Low |
| Arrival | guest2 | Low |
| ceremony | bride and not groom | Medium |
| ceremony | groom and not bride | Medium |
| ceremony | bride and groom | High |
| ceremony | guest1 | Low |
| ceremony | guest2 | Low |
| outside | number of people >5 | High |
| signing | bride and groom | High |
| exit | bride and groom | High |
| Cake | bride and groom | High |
| reception | bride and groom | High |
| reception | bride and guest1 | Medium |
| reception | guest2 | Low |

Two or more of these methods for generating queries can be combined.

In one embodiment, query generation is personalized. This can be accomplished by varying the selection criteria and/or having a personalized query probability distribution. For example, a collection which is personalized for guest 2 may assign a medium or high probability weighting to images in the schema above in which guest 2 is identified.

The selection of images in the collection may provide for user input. For example, a collection user or authorized user views the collection which has been proposed by the system in step S 118. Some of the images may include undesirable attributes which are not readily recognizable by the system 1, such as a person with their eyes shut. The user may deselect these images and the system will propose a new collection. This may involve starting again with an empty set and using the method to refill the collection. Or, the system may look for images to replace those deselected, by searching for images which have the same or similar features and image quality.

In addition to recommending images for a collection, the system 1 may also control access to the images. Different users may be accorded different levels and/or extent of access. The access level may vary from full access (access to a high resolution version of an image in the collection, including any appropriate image modification, suitable for printing) to a more limited access, e.g., to a lower resolution version of the image which such as a thumbnail, can be used to identify the image's content, or simply to a description of the image, such as the time, location, image quality, and people present. For any given user, different levels of access may be accorded to different images in the collection. For example, collection users may be accorded access only to low resolution images, such as thumbnails, or image descriptions, of all images in the collection until a purchase of the collection or selected images is made. Device users may be permitted full access to those images in the collection which are obtained from their device and a more limited access to the other images in the collection. Access may also be accorded by time and date, so that some users may have access only to portions of the collection. Other access restrictions may be implemented, based on selection criteria or other factors.

As examples of potential uses of the system, the following scenarios are provided. Each scenario is described as it is currently and then how the system 1 could improve on the current situation.

Scenario 1: The Marriage

Kirstie and James are planning their wedding. They have a large number of guests and want to produce a souvenir of the event showing as many of the guests and events taking place during the ceremony and reception as possible. They have a limited budget and can only afford to hire a professional photographer for the wedding ceremony and the formal photographs after the ceremony. However, they know that many of the guests will be bringing cameras and are counting on them to cover events that take place after the professional photographer has finished as well as providing an alternative point-of-view of the wedding ceremony. The only problem is that they know they will receive a large number of photographs of varying quality and over a period of weeks as individual guests get around to emailing photographs or mailing CDROMs. This means that they will need to sort through a large number of photographs and potentially wait a few weeks before they can produce a definitive set. Ideally, they would like to have an on-line record ready soon after the event in order for guests to select photographs and to show friends and relatives who were not able to attend. However, installing the system 1 at the wedding venue allows the capture of photographs taken during the event itself. The system 1 examines the quality of each photo, applies automatic image enhancement where necessary, and selects a set of photographs that maximizes the number of different scenes and the overall quality while minimizing the number of duplicate photos.

Scenario 2: The Conference

IGOR is a small scientific conference in the domain of nanotechnology. Each year the conference organizers write an on-line report of the conference that includes photographs of delegates. There are a number of professional photographers who take a number of photographs during each session and sell prints to the delegates. The conference organizers have an agreement with the photographers that they can select a number of such photographs to include in the report but they rarely have the time to examine all the photographs taken and instead normally pick one from one of the keynote sessions. The system 1 can help matters by presenting a selection of the images with highest quality and showing the largest number of speakers. In addition it helps the photographers by providing them with a faster means of uploading their photographs to centralized storage—since photographs are continually collected from the cameras by the system 1, there is no need to spend the time manually connecting a camera to a computer in order to upload the images.

Scenario 3: Field Trip

Staff and students in the biology department at a university make regular field trips in areas around the locality. Individual members of the team tend to stray quite far away from one another in order to cover the allocated area and they collect data as notes in paper notebooks, biological samples and digital photographs. On return from the trip each member is responsible for typing up their notes and uploading their photos. A different person each time is allocated the job of making a unified report from all the typed-in notes and the collections of photographs taking during the trip. Since the team members stray further than 10-20 m from one another the system 1 cannot be used to collect photographs in real-time; however it can help with organizing the photographs once all the members of the field trip have returned. It can extract the time and/or the position the photograph was taken and each collection can be associated with a person so it has the same information available as if it had captured the photographs in real-time.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
   acquiring images from a plurality of digital image acquisition devices to form a set of images;
   storing the set of images in memory of an image selection system;
   specifying image selection criteria, each of the selection criteria including a weighting which reflects a relative significance of the selection criterion;
   for each of a plurality of images in the set of images, determining an image quality value for the image; and
   with software and hardware of the image selection system:
      recommending images for a collection of digital images from the set of images including taking into consideration the image quality value for the images and the degree to which the collection satisfies the image selection criteria.

2. The method of claim 1, further comprising:
   for each of a plurality of the images in the set:
      extracting at least one feature within the image using a recognition component; and
      labeling the image with a label which corresponds to the extracted feature, the recommending of the images including using the image labels of a plurality of the images in applying the image selection criterion.

3. The method of claim 2, wherein at least one of the selection criteria seeks to include a selected feature in the collection, the recommending of the images including selecting at least one image labeled with the feature for inclusion in the collection.

4. The method of claim 2, wherein the recommending of the images includes maximizing the number of different labeled features in the image collection.

5. The method of claim 2, wherein the features include at least one of people and locations and wherein the recognition component is operable to recognize at least one of:
   a part of a person by which the person is distinguishable from other people; and
   a part of a location by which the location is distinguishable from other locations.

6. The method of claim 1, wherein the method further includes interacting with a user to generate at least one of:
   a number of images to be in the collection;
   whether to apply automatic enhancement techniques to images in the set of images;
   a feature selection criterion; and
   a weighting to be applied to a feature selection criterion.

7. The method of claim 1, wherein the image selection criteria include at least one of:
   attempting to include images of at least one selected person in the collection;
   attempting to include images of at least one selected location in the collection;
   attempting to maximizing a number of different people in the collection;
   attempting to maximize a number of different locations in the collection; and
   combinations thereof.

8. The method of claim 1, further including:
   accessing metadata associated with images in the set; and
   using the metadata to determine whether at least one of the at least one image selection criterion is satisfied.

9. The method of claim 1, wherein the recommending of images for the collection includes selecting images for the collection based on a product of the image quality value of an image and an extent to which the image satisfies the selection criteria.

10. The method of claim 1, wherein the determining of the image quality value for the image comprises automatically assigning a value to the image based on at least one of the image's exposure, contrast, saturation, color balance, and extent of blur.

11. The method of claim 1, further comprising:
   recommending a second collection of digital images from the set of images including applying at least one image selection criterion different from the first image selection criterion in recommending the second collection of images.

12. The method of claim 1, wherein the steps of determining an image quality value for the image and recommending images for the collection are automated.

13. The method of claim 1 wherein the images are selected from the group consisting of digital images, sequences comprising a plurality of images, and combinations thereof.

14. The method of claim 1, wherein the collection includes no greater than a predetermined maximum number of images which is fewer than the number of images in the set.

15. The method of claim 1, further comprising:
providing restricted access to the collection.

16. A method comprising:
acquiring images from a plurality of digital image acquisition devices to form a set of images;
storing the set of images in memory of an image selection system;
specifying image selection criteria, each of the selection criteria including a weighting which reflects a relative significance of the selection criterion;
for each of a plurality of images in the set of images, determining an image quality value for the image; and
with software and hardware of the image selection system:
recommending images for a collection of digital images from the set of images including taking into consideration the image quality value for the images and the degree to which the collection satisfies the image selection criteria, the recommending of the images for the collection including:
a) while the collection has fewer than a desired number of images in the collection, for each image p from the set, computing a score (p) which corresponds to the change in the expected reward for the collection E[reward|C], if image p were to be included with the collection, where:

$$E[\text{reward} | C] = \sum_{q \in Q} \pi_q \max_{p \in C} w_q^p$$

where $\pi_q$ is a probability weighting which reflects a significance of one of the selection criteria expressed by a query q of a set of queries Q, and $W_q^p$, represents a measured image quality of image p that satisfies the query if the image satisfies the query q, otherwise, if the image does not satisfy query q then $W_q^p=0$,
C is the collection; and
b) selecting an image for the collection from a set of remaining unselected images and which has the highest score (p).

17. An article of manufacture comprising a storage medium which stores software for performing a method which includes:
providing for specifying image selection criteria;
for each of a plurality of images in a set of images, determining an image quality value for the image; and
recommending images for a collection of digital images from the set of images including taking into consideration the image quality value for the images and the degree to which the collection as a whole satisfies the image selection criteria.

18. The article of claim 17, wherein each of the provided selection criteria includes a weighting which reflects the relative significance of the selection criterion.

19. A method for forming a collection of images of an event comprising:
capturing images of the event with a plurality of digital devices;
acquiring the images captured by the digital devices with an image selection system comprising an acquisition processor; and
recommending a collection of digital images from a set of the acquired images by the method of claim 1.

20. A system for recommending a collection of digital images from a set of images comprising:
a component for evaluating images in the set of images and assigning an image quality value to each of the evaluated images;
a memory which stores image selection criteria selected from:
a) a desired number or range of photographs in the collection;
b) a minimum image quality threshold for images in the collection;
c) a diversity selection criterion which specifies that the collection should attempt to capture at least one of a maximum number of different people and a maximum number of different locations;
d) a feature selection criterion, which specifies that the collection should attempt to capture at least one of the group consisting of selected people and selected locations;
e) a device or user selection criterion, which specifies that the collection should attempt to include a roughly equal number of images from each contributing device or device user; and
a module for recommending images for the collection, taking into consideration the image quality value for the images and the degree to which the collection satisfies selected ones of the image selection criteria, the module including software and hardware for selection of the images.

21. The system of claim 20, further comprising a user interface for receiving user input regarding at least one of:
a number of images to be included in the collection;
whether to apply automatic enhancement techniques to images in the set of images;
at least one selection criterion; and
a weighting of a selection criterion.

22. The system of claim 20, further comprising:
an acquisition processor for acquiring images captured by at least one digital device.

23. An assembly comprising the system of claim 20 and a plurality of digital devices, the assembly including an input device for acquiring images captured by the digital devices.

24. A system for automatically recommending a collection of digital images from a set of images comprising:
an acquisition processor for acquiring images from a plurality of digital devices;
a software component for identifying images in the set of images which are responsive to at least one of a plurality of queries and assigning a label to an image corresponding to which of the queries it is responsive to;
a software component for automatically evaluating images in the set of images for image quality;
a module including software for recommending images for the collection based on an image quality value for each image which takes into account an image's label and its evaluated image quality; and
hardware for running the software.

25. A method comprising:
specifying image selection criteria, each of the selection criteria including a weighting which reflects a relative significance of the selection criterion;
for each of a plurality of images in the set of images, determining an image quality value for the image; and
with software and hardware of an image selection system, recommending images for a collection of digital images from the set of images including taking into consideration the image quality value for the images and the degree to which the collection satisfies the image selection criteria, the recommending of the images for the collection including:

a) white the collection has fewer than a desired number of images in the collection, for each image p remaining in the set of images which has not yet been added to the collection, computing a score (p) which corresponds to the change in an expected reward based on satisfying of the image selection criteria, assuming image p were to be included with the collection;

b) selecting an image for the collection from a set of remaining unselected images and which has the highest computed score (p); and repeating a) and b) until the collection has the desired number of images.

* * * * *